T. J. KEHOE.
VEHICLE BODY.
APPLICATION FILED APR. 22, 1916.
1,364,282. Patented Jan. 4, 1921.
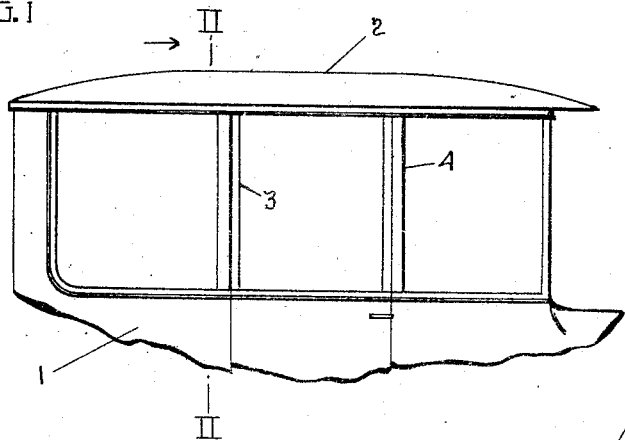
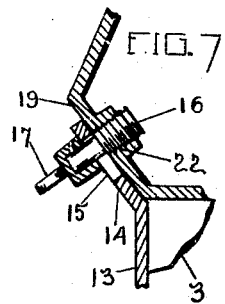
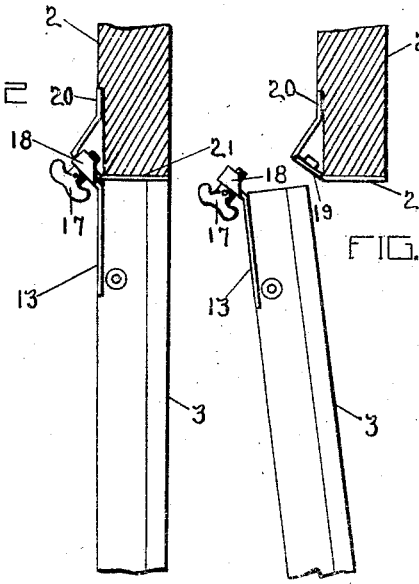
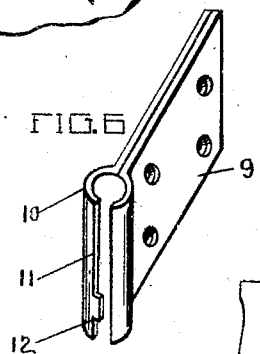
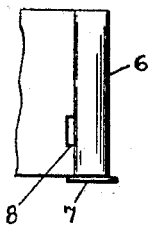
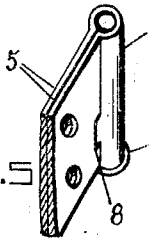
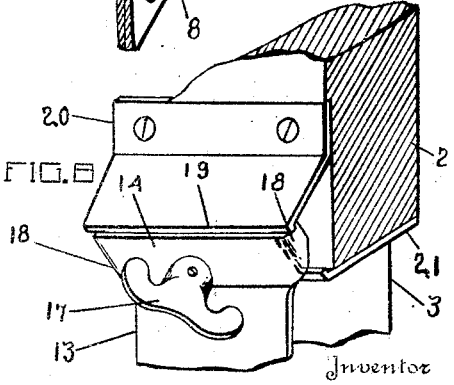
Inventor
Thomas J Kehoe
By
Attorney

UNITED STATES PATENT OFFICE.

THOMAS J. KEHOE, OF TOLEDO, OHIO, ASSIGNOR TO THE WILLYS-OVERLAND COMPANY, OF TOLEDO, OHIO, A CORPORATION OF OHIO.

VEHICLE-BODY.

1,364,282.   Specification of Letters Patent.   Patented Jan. 4, 1921.

Application filed April 22, 1916.  Serial No. 92,832.

*To all whom it may concern:*

Be it known that I, THOMAS J. KEHOE, a citizen of the United States of America, residing at Toledo, Lucas county, Ohio, have invented new and useful Vehicle-Bodies, of which the following is a specification.

This invention relates to vehicle bodies especially knock-down features thereof.

This invention has utility when incorporated in readily disconnectible wrought metal connections of light weight and uniform strong construction for easy application independent of extensive machining with entire absence of separable parts other than the disconnected member.

Referring to the drawings:

Figure 1 is a fragmentary side elevation of an embodiment of the invention in a vehicle top, say of the sedan type for motor vehicles;

Fig. 2 is a section on the line II—II, Fig. 1, looking in the direction of the arrow, intermediate portions being broken away;

Fig. 3 is a view similar to Fig. 2 with the parts in partially disconnected position;

Fig. 4 is a side elevation and Fig. 5 is a fragmentary perspective view of the transverse guide;

Fig. 6 is a perspective view of the eye for coacting with the guide;

Fig. 7 is a medial vertical section and Fig. 8 is a perspective view on an enlarged scale of the upper disconnectible or locking member.

The vehicle body comprises the side 1 and the top 2 between which may be placed the removable spacing pillars 3, 4. Mounted in the side 1 may be the welded together strap portions 5 of the transverse cylindrical guide 6 having the flare end 7 and the recess 8. The pillar carries the coacting fitting embodying the welded together strap portions 9 carrying the eye 10 with the slot 11 movable over the strap portions 5 of this fitting and rockable to have the tongue 12 engage with recess 8 when the eye 10 is over snugly in seating relation with the flare or flange portion 7. This angular movement relatively to the transverse movement of bringing the parts into coacting engagement provides a snug holding and bearing between the parts throughout the embracing or enveloping extent thereof. In swinging the pillar up so that the tongue 12 engages the recess 8 the locking may be effected.

The free end of the pillar has mounted thereon the strap portion 13 having the angularly disposed extension 14 provided with a slot 15 through which loosely extends the threaded member 16 having fast on the outer end thereof the wing device 17 thereby forming a wing bolt. This angular disposed portion 14 has side interengaging portions 18 movable into seating relation as to the sheet metal portion 19 of the opposing fitting having the top engaging portions 20, 21. This portion 19 has the integral or relatively rigid threaded portion 22 into which threaded opening 22 the wing bolt 17, 16, may be threaded in drawing the pillar into firmly held locking position. This wing bolt 17, 16, is not separable from the pillar.

The pillar may be removed to knockdown position by the manipulation of this single non-separable locking device or wing bolt for with this part threaded out of the opening 22 the pillar may be swung back to the position shown in Fig. 3, then slipped transversely to free the guide from the eye thereby completing the knock-down of the pillar in providing a clear way on the side of the vehicle. This removed pillar may be placed under the seat or elsewhere as may be found convenient and quickly replaced by reversing the series of acts recited and thereby provide a spacing and stiffening means between the top and side. The disconnectible fittings for the pillar are of wrought or sheet metal which may be stamped out in quantities for cheap assembly in accurate relation.

What is claimed and it is desired to secure by Letters Patent is:

1. In a vehicle body provided with a top, the combination of removable door and window posts; separable hinges for the lower ends of said door and window posts, each comprising a member carrying a pintle and provided with a slot adjacent said pintle, and a member provided with a knuckle adapted to have a limited rotational movement and a transverse movement on said pintle, said knuckle being provided with spaced edges, and a tongue extending from one of said edges and adapted to co-act with said slot; and means for interlocking the tops of the posts with the top of the vehicle.

2. In a vehicle provided with a top, the combination of a plurality of removable door and window posts; means for detachably securing the lower ends of the posts to the body; and detachable interlocks for the tops of the posts, each interlock comprising a plate secured to the vehicle top and provided with an inclined portion having an internally threaded boss, a plate attached to the post and provided with a slot, and a wing bolt carried by said plate and extending through said slot and provided with a threaded end adapted to be screwed into the internally threaded boss on the plate secured to the top.

3. In a vehicle body provided with a top, the combination of a plurality of removable door and window posts; means for detachably securing the bottoms of the posts to the body; and separable interlocks at the tops of the posts, each comprising a post plate provided with a slot and with laterally extending fingers at the edges thereof, a top plate provided with an inclined portion having an internally threaded boss, the edges of said inclined portion being adapted to be engaged by said laterally extending fingers, and a bolt extending through the slot in said post plate and adapted to be screwed into said internally threaded boss.

4. In a vehicle body provided with a top; posts for holding windows at the sides; parts of locking devices secured to the top; detachable parts of said locking devices secured to the tops of the posts and engageable with said first mentioned parts; portions of securing devices carried by the body; and detachable portions of said securing devices attached to the bottom of the posts and engageable with the first mentioned portions of said securing devices, said locking devices and securing devices being arranged so that the one has to be first released and the post tipped to an angular position and then moved in a direction transverse to its length and parallel to the side of the body to release the post from the body.

5. In a vehicle, the combination with a body, provided with a top, of removable posts; a separable hinge connecting the lower end of each post with the body, one part of said hinge being slidable on the other part of said hinge transversely of said post, at a predetermined angular position of said hinge members relative to each other; and separable locking devices connecting the tops of said posts to said top.

6. In a vehicle, the combination with a body having a top, of removable posts extending between said top and body; a separable two-part hinge connecting the lower end of each post to the body and comprising a pintle member secured to one of said parts, and a knuckle member secured to the other of said parts, said knuckle member being slidable on said pintle member in a direction parallel to the axis of said pintle member to separate said hinge members at a pre-determined angular position of said hinge members relative to each other; and a separable locking device connecting the top of each post with said top.

7. In a vehicle, the combination with a body provided with a top, of removable posts extending between said body and said top; a separable hinge connecting the lower end of each post with said body and permitting the complete separation of said post and said body by an angular movement of said post followed by a transverse movement parallel to the axis of said hinge; means carried by the hinge for limiting said angular movement and separable locking means connecting the tops of said posts and said top.

8. A separable hinge for connecting an end of a door or window post in a vehicle body, comprising a pintle and a knuckle, said pintle being connected with an attaching member, said knuckle being formed of curved extensions on attaching plates therefor, the terminals of said extensions being spaced apart, and one of said extensions being provided with a tongue adapted to project within a slot in the pintle attaching member.

9. In a vehicle provided with a top, the combination of removable door and window posts, and means for detachably securing an end of said posts within the vehicle body, comprising a sheet metal plate having a flat portion, a portion inclined thereto, a second inclined portion connected with said first mentioned inclined portion, terminating in a flattened portion extending substantially at right angles to said first mentioned portion, said plate adapted to be attached to a side and edge of a portion of the vehicle body or top by said flattened portions, the inclined portions forming a spacing between said plates and the vehicle, one of said inclined portions being provided with a screw threaded opening and a locking bolt carried by the removable post, co-acting with the threaded opening in the inclined portion of said plate to detachably secure said pillar in place.

10. In a vehicle, the combination of a body provided with a top, a removable post extended between said body and said top, a separable hinge connecting the lower end of each post to said body, constructed to permit complete separation of said post and body by an angular movement of said post, followed by a transverse movement parallel to said hinge, said hinge being constructed to limit said angular movement, and separable locking means connecting the tops of said posts and said top.

In witness whereof I affix my signature.

THOMAS J. KEHOE.